United States Patent
Bleicher et al.

(10) Patent No.: US 9,225,100 B2
(45) Date of Patent: Dec. 29, 2015

(54) SOCKET HOUSING

(75) Inventors: Martin Bleicher, Fichtenau (DE); Peter Goesele, Ellwangen-roehlingen (DE); Roland Kraus, Harthausen-essingen (DE); Rainer Lang, Dinkelsbuehl (DE); Josef Sinder, Ellwangen (DE); Frank Stredak, Feuchtwangen (DE)

(73) Assignee: TE Connectivity Germany GmbH, Bensheim (DE)

( * ) Notice: Subject to any disclaimer, the term of this patent is extended or adjusted under 35 U.S.C. 154(b) by 131 days.

(21) Appl. No.: 13/576,377

(22) PCT Filed: Jan. 25, 2011

(86) PCT No.: PCT/EP2011/050978
§ 371 (c)(1),
(2), (4) Date: Jul. 31, 2012

(87) PCT Pub. No.: WO2011/092159
PCT Pub. Date: Aug. 4, 2011

(65) Prior Publication Data
US 2012/0315797 A1    Dec. 13, 2012

(30) Foreign Application Priority Data
Feb. 1, 2010    (DE) .......................... 10 2010 001 435

(51) Int. Cl.
*H01R 24/00*    (2011.01)
*H01R 13/50*    (2006.01)
(Continued)

(52) U.S. Cl.
CPC .............. *H01R 13/50* (2013.01); *H01R 13/506* (2013.01); *B29C 45/006* (2013.01); *B29C 2045/0065* (2013.01); *B29L 2031/34* (2013.01); *H01R 13/4361* (2013.01); *H01R 13/5219* (2013.01)

(58) Field of Classification Search
CPC ............. H01R 13/2442; H01R 13/514; H01R 13/4223; H01R 13/4362; H01R 13/5219
USPC ................................... 439/626, 595, 752, 271
See application file for complete search history.

(56) References Cited

U.S. PATENT DOCUMENTS 3,429,041 A * 2/1969 Patton, Jr. ........................ 29/883
5,460,536 A * 10/1995 Cullen ........................... 439/289
(Continued)

FOREIGN PATENT DOCUMENTS

| | | |
|---|---|---|
| FR | 2 784 510 A1 | 4/2000 |
| WO | WO 96/34429 A1 | 10/1996 |
| WO | WO 00/68607 A1 | 11/2000 |

OTHER PUBLICATIONS

International Preliminary Report on Patentability issued by the International Bureau of WIPO, Geneva, Switzerland, dated Aug. 7, 2012 for related International Application No. PCT/EP2011/050978; 5 pages.
(Continued)

*Primary Examiner* — Abdullah Riyami
*Assistant Examiner* — Vladimir Imas
(74) *Attorney, Agent, or Firm* — Faegre Baker Daniels LLP (57) ABSTRACT

A socket housing comprises an inner part and an outer part, the inner part being formed to receive at least one electrically conductive contact element, and a wall of the outer part defining a cavity. Therein, the inner part and the outer part are arranged adjoining one another. An external diameter of the inner part is equal to or less than an internal diameter of the outer part. The socket housing is formed in one piece, the inner part and the outer part being connected via a crosspiece formed as a predetermined breaking point.

12 Claims, 5 Drawing Sheets

(51) Int. Cl.
*H01R 13/506* (2006.01)
*B29C 45/00* (2006.01)
*B29L 31/34* (2006.01)
*H01R 13/436* (2006.01)
*H01R 13/52* (2006.01)

(56) References Cited

U.S. PATENT DOCUMENTS

| | | | |
|---|---|---|---|
| 6,390,857 B1 * | 5/2002 | Pickles et al. | 439/680 |
| 6,626,702 B2 * | 9/2003 | Kurimoto et al. | 439/595 |
| 6,921,113 B1 * | 7/2005 | Vlasblom | 285/307 |
| 7,572,150 B2 * | 8/2009 | Matsuoka | 439/626 |
| 7,959,470 B1 * | 6/2011 | Umetsu et al. | 439/626 |
| 8,021,191 B2 * | 9/2011 | Long | 439/626 |
| 8,215,974 B2 * | 7/2012 | Lau et al. | 439/176 |
| 8,342,880 B2 * | 1/2013 | Kato et al. | 439/595 |
| 8,454,391 B2 * | 6/2013 | Hsiao et al. | 439/626 |
| 8,523,587 B2 * | 9/2013 | Suzuki et al. | 439/262 |
| 8,545,270 B2 * | 10/2013 | Yu et al. | 439/626 |
| 8,550,853 B2 * | 10/2013 | Fukushi | 439/626 |
| 8,608,498 B2 * | 12/2013 | Suzuki et al. | 439/262 |
| 8,636,547 B2 * | 1/2014 | Ha et al. | 439/626 |
| 2003/0190834 A1 * | 10/2003 | Barlian et al. | 439/352 |
| 2006/0166553 A1 | 7/2006 | Miyakawa et al. | |
| 2009/0075506 A1 * | 3/2009 | Suzuki | 439/157 |

OTHER PUBLICATIONS

International Search Report and Written Opinion issued by the European Patent Office, Rijswijk, NL, dated May 3, 2011 for related International Application No. PCT/EP2011/050978; 9 pages.

* cited by examiner

SOCKET HOUSING

The invention relates to a socket housing in accordance with the preamble of claim 11.

BACKGROUND

Socket housings for receiving electrically conductive contact elements and for producing electrically conductive connections are known in a large number of embodiments. Frequently, such socket housings have an inner housing for receiving the contact elements and an outer housing for receiving the inner housing. Frequently a sealing element for producing a tight socket housing may be arranged between the inner housing and the outer housing. A locking hook may be present in the inner housing as second contact securing means for fixing the contact elements.

One aim which is of prime importance in the configuration of such socket housings is the possibility of inexpensive manufacture and assembly. This aim can be achieved for example by a reduction in the number of individual components which are necessary. If the components of the socket housing are produced by injection moulding, then each additional component requires its own dies and moulds. In addition, the possibilities of mis-assembly increase with the complexity of the component.

DE 298 05 026 U1 describes a housing for an electrical plug. Conductive contact elements can be arranged and fixed by a locking mechanism in the housing.

EP 0 164 211 B1 describes a moulded insulator housing made from thermoplastic material, into which an electrically conductive terminal can be inserted. The terminal can be fixed in the housing by means of a terminal lock.

EP 0 823 137 B1 describes an electrical connector with electrical contacts which can be fixed in the housing of the connector via primary retaining means and secondary retaining means. The secondary retaining means in this case are initially connected to the housing of the connector by breakable connecting parts. For application of the secondary retaining means, the breakable connecting parts are broken.

SUMMARY

The object of the present invention is thus to provide a socket housing which is improved compared with known socket housings. This object is achieved by a socket housing having the features of Claim 11. Preferred developments are set forth in the dependent claims.

A socket housing according to the invention comprises an inner part and an outer part, the inner part being formed to receive at least one electrically conductive contact element and a wall of the outer part defining a cavity. In this case, the outer part and the inner part are arranged adjoining one another. Further, an external diameter of the inner part is equal to or less than an internal diameter of the outer part. Furthermore, the socket housing is formed in one piece, the inner part and the outer part being connected via a crosspiece formed as a predetermined breaking point. Advantageously, the one-piece embodiment of the socket housing permits particularly simple and inexpensive production in only one operation. It is likewise advantageous that the assembly of the socket housing is simplified by the one-piece embodiment.

Preferably the crosspiece is arranged in circumambient manner, at least in sections, on an end-face end of the wall of the outer part facing the inner part. Advantageously, then the force necessary for breaking the crosspiece can be set within a wide range by the thickness of the crosspiece and the angular range covered by the circumambient arrangement of the crosspiece.

Particularly preferably, the crosspiece can be severed by exerting a force which is directed in the direction of the outer part on the inner part and/or a force which is directed in the direction of the inner part on the outer part such that the inner part, at least in sections, can be inserted into the cavity of the outer part. Advantageously this permits particularly simple and rapid assembly of the socket housing.

In a development of the socket housing, the inner part has at least one locking hook on its outer surface, and the outer part has at least one locking slot in its wall. In this case, the at least one locking hook and the at least one locking slot are arranged such that the at least one locking hook engages in the at least one locking slot if the inner part is inserted into the cavity of the outer part. Advantageously, inadvertent withdrawal of the inner part from the cavity of the outer part can then be prevented by engaging the at least one locking hook in the at least one locking slot. Furthermore, the engagement of the at least one locking hook in the at least one locking slot can represent a way of checking whether the inner part has been inserted sufficiently far into the cavity of the outer part.

In a particularly preferred embodiment of the socket housing, the at least one locking hook has a chamfer which faces the outer part. Advantageously, this chamfer then facilitates engagement of the at least one locking hook in the at least one locking slot.

In an additional development of the socket housing, a section of the wall of the outer part forms a snap closure, with an aperture, which closure is connected via at least one spring element to the other sections of the wall, the snap closure being able to be deflected against the other sections of the wall. Furthermore, a section of the wall adjacent to the snap closure forms a stop which limits the deflection ability of the snap closure in at least one spatial direction. Advantageously, the snap closure can then serve for locking a plug, which is to be connected to the socket housing, with the socket housing. One further advantage is that the stop prevents deflection of the snap closure beyond the limits of elastic deformability. This means that damage to the socket housing can be avoided.

Preferably the stop has a stop projection facing the snap closure. Advantageously, the stop projection then prevents deflection of the snap closure beyond the limits of elastic deformability.

In another development of the socket housing, the inner part has an elastically pivotable lever which can be latched with the inner part, the lever being formed to fix, in the latched position, a contact element which is received in the inner part. Advantageously, the elastically pivotable lever can then serve as a second contact securing means.

Preferably the inner part has a sealing region on which a sealing element can be arranged. Advantageously this permits sealing of the socket housing.

Preferably the socket housing is produced from a thermoplastic material by injection moulding. Advantageously the manufacture of the socket housing is then particularly inexpensive.

The invention will be explained in greater detail below with reference to figures. These show.

BRIEF DESCRIPTION OF THE DRAWINGS

DETAILED DESCRIPTION

Figure 1:
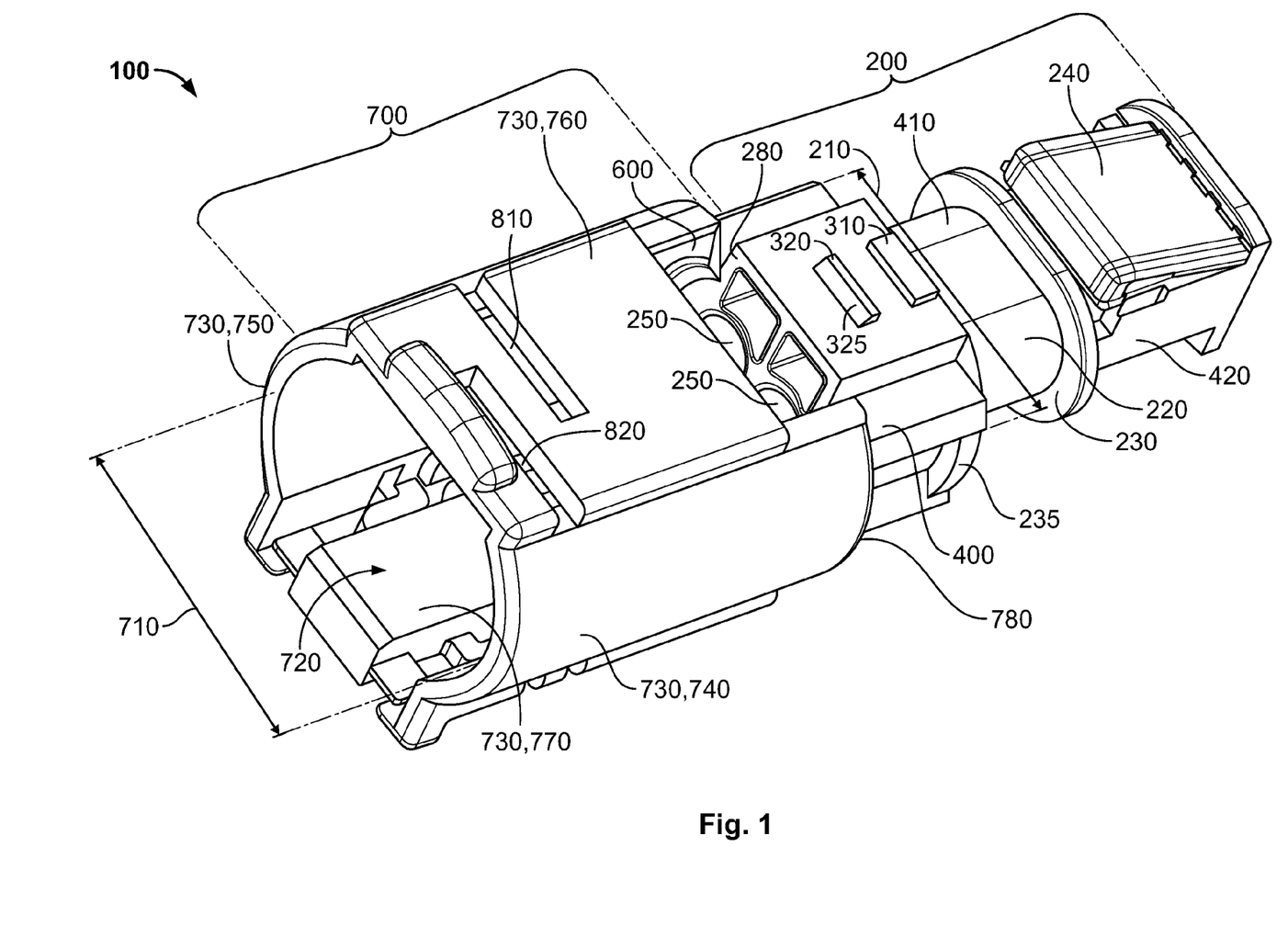
FIG. 1: a perspective view of a socket housing obliquely from above.

FIG. 1 shows a perspective oblique view of a socket housing 100. The socket housing 100 may serve for receiving electric contact elements which are for example manufactured from copper, and may be provided for connection with a suitably configured plug. The socket housing 100 may for example serve for producing an electrical connection in a motor vehicle. The socket housing 100 is formed in one piece, consists preferably of a thermoplastic material and has preferably been produced by injection moulding.

The socket housing 100 comprises an inner part 200 and an outer part 700. The outer part 700 has a basic form approximately in the form of a cylindrical casing. In this case, the outer part 700 consists by way of example of a wall 730 which surrounds a cavity 720. The wall 730 comprises a first arcuate wall section 740 and a second arcuate wall section 750 which is located opposite the first arcuate wall section 740. The arcuate wall sections 740, 750 have approximately the form of segments of a cylindrical casing, and their outwards-curved inner sides face each other. The arcuate wall sections 740, 750 are connected together by an upper flat wall section 760 and a lower flat wall section 770. The upper flat wall section 760 and the lower flat wall section 770 are formed approximately flat and oriented plane-parallel to each other.

The inner part 200 has an elongate form with a longitudinal axis which is coaxial to the longitudinal axis of the outer part 700 which is substantially in the form of a cylindrical casing. In the direction of the longitudinal axis of the inner part 200, the inner part 200 can be divided roughly into a first section 400, a second section 410 and a third section 420. The sections 400, 410, 420 in this case directly adjoin each other in the direction of the longitudinal axis of the inner part 200. A first end face 280 of the first section 400 of the inner part 200 is directly adjacent to a second end face 780 of the outer part 700.

The cavity 720 which is surrounded by the wall 730 of the outer part 700 has an internal diameter 710 in a direction perpendicular to the longitudinal axis of the outer part 700. The inner part 200 has an external diameter 210 in a direction perpendicular to the longitudinal axis of the inner part 200. The external diameter 210 is smaller than the internal diameter 710, so that there is space for the inner part 200 in the cavity 720 of the outer part.

The outer part 700 and the inner part 200 are for example connected together via a two-part crosspiece 600. On the outer part 700, the crosspiece 600 in this embodiment is arranged on the end of the two arcuate wall sections 740, 750 which faces the second end face 780. On the inner part 200, the crosspiece 600 in this embodiment is arranged on the end of the first section 400 of the inner part 200 which faces the first end face 280. In the embodiment illustrated, the crosspiece 600 is divided into two sections which are separated from each other, the first of which extends on the first arcuate wall section 740 and the second of which extends on the second arcuate wall section 750. The crosspiece 600 extends along the entire angular range swept by the first arcuate wall section 740 and the second arcuate wall section 750. In alternative embodiments, the two sections of the crosspiece 600 may however also be limited to a partial section of the angles covered by the wall sections 740, 750. Alternatively, the crosspiece 600 may also be provided only either on the first arcuate wall section 740 or only on the second arcuate wall section 750. The crosspiece 600 connects the inner part 200 to the outer part 700 and serves as a predetermined breaking point. The force necessary to break the crosspiece 600 can be established via the length of the crosspiece 600 and the strength of the material forming the crosspiece 600. The crosspiece 600 can also be referred to as an integral hinge or as a tear seam.

In the interior of the inner part 200 there are provided for example two approximately cylindrical cutouts oriented parallel to the longitudinal axis of the inner part 200, which cutouts serve as contact element receptacles 250. Alternatively, also only one or more than two contact element receptacles 250 might be provided. Electrically conductive contact elements may be arranged in the contact element receptacles 250. The contact elements may for example consist of copper.

If a force directed in the direction of the outer part 700 is exerted on the inner part 200 while the outer part 700 is held stationary, or if a force directed in the direction of the inner part 200 is exerted on the outer part 700 while the inner part 200 is held stationary, then the crosspiece 600 connecting the inner part 200 to the outer part 700 will break or tear if the force is sufficiently great. Since the external diameter 210 of the inner part 200 is less than the internal diameter 710 of the outer part 700, the inner part 200 can then be inserted in sections into the cavity 720 of the outer part 700. The length of the outer part 700 in the longitudinal direction is calculated such that there is space for the first section 400 and the second section 410 of the inner part 200 completely in the cavity 720 of the outer part 700. The third section 420 of the inner part 200, projects beyond the end face end of the outer part 700 even when the inner part 200 is inserted into the cavity 720 of the outer part 700.

The upper flat wall section 760 of the wall 730 of the outer part 700 has a first locking slot 810 and a second locking slot 820. The locking slots 810, 820 are formed as elongate apertures which are oriented perpendicular to the longitudinal axis of the outer part 700. The first section 400 of the inner part 200 has a first locking hook 310 and a second locking hook 320. The locking hooks 310, 320 are formed as elongate projections which are arranged parallel to each other and perpendicular to the longitudinal axis of the inner part 200 on a surface of the first section 400 of the inner part 200. If the inner part 200 is inserted into the outer part 700 once the crosspiece 600 has been broken, the first locking hook 310 will latch in the first locking slot 810 and the second locking hook 320 in the second locking slot 820. Due to the latching of the locking hooks 310, 320 in the locking slots 810, 820, inadvertent withdrawal of the inner part 200 from the outer part 700 is prevented after the insertion of the inner part 200 into the cavity 720 of the outer part 700. In order to facilitate the insertion of the inner part 200 into the cavity 720 of the outer part 700, an edge of the second locking hook 320 which faces the outer part 700 may have a chamfer 325. The chamfer 325 may however also be dispensed with in a simplified embodiment. In embodiments which are further simplified, one or both locking hooks 310, 320 and one or both of the locking slots 810, 820 may also be dispensed with.

The second section 410 of the inner part 200 forms a sealing region 220 which is delimited with respect to the third section 420 by a circumambient first stop 230 and with respect to the first section 400 by a circumambient second stop 235. A sealing element, for example a sealing ring, may be arranged in the sealing region 220. The sealing element arranged in the sealing region 220 may serve to seal off the space between the inner part 200 and the outer part 700 if the inner part 200 has been inserted into the cavity 720 of the outer part 700.

The third section 420 of the inner part 200 has a lever which is connected elastically on one side to the third section 420 of the inner part 200 and may serve as a second contact securing means 240. This will be explained in greater detail below with reference to FIG. 3.

Figure 2:
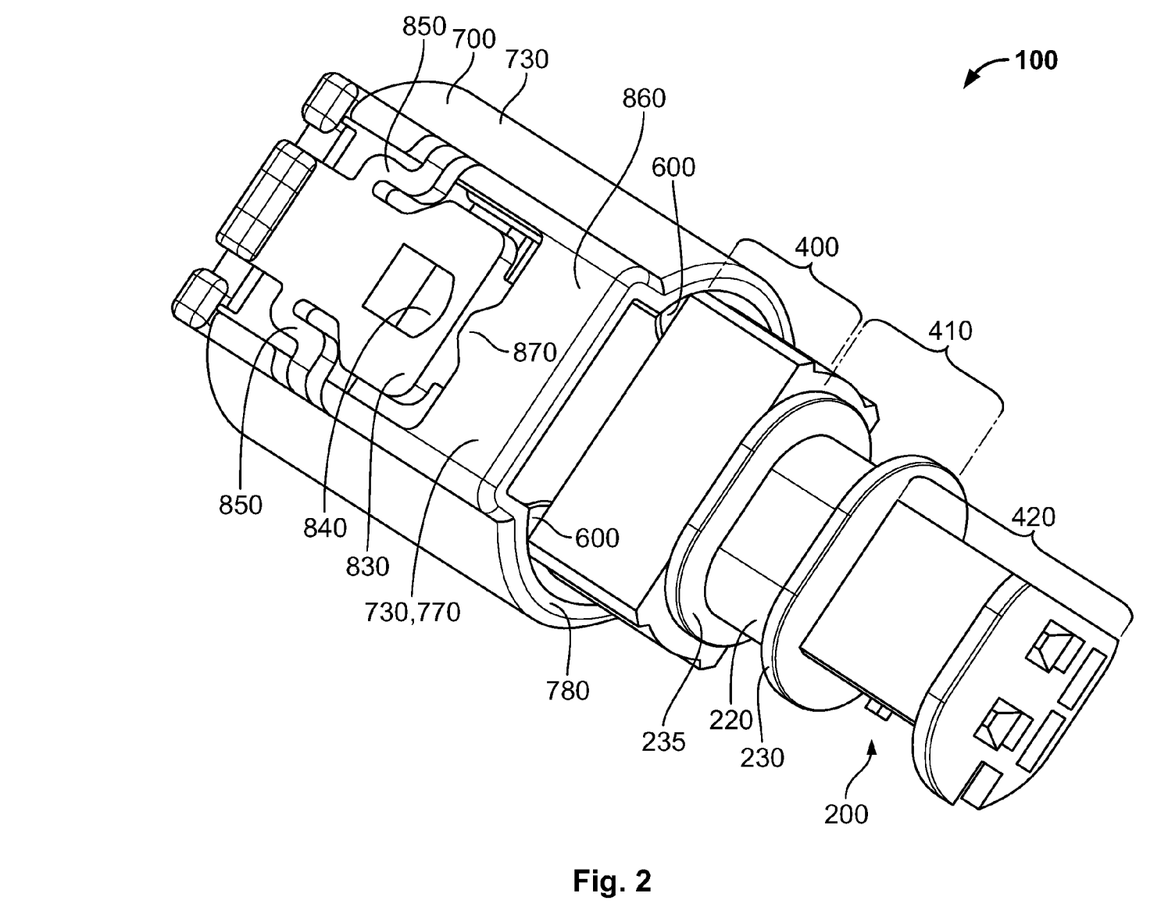
FIG. 2: a perspective view of a socket housing obliquely from below.

FIG. 2 shows a perspective oblique view of the socket housing 100 from below. It can be seen in FIG. 2 that the lower flat wall section 770 of the wall 730 of the outer part 700 has cutouts through which a snap closure 830 is exposed in the plane of the lower flat wall section 770 and is connected only via two elastically deformable spring arms 850 to the other sections of the lower flat wall section 770. The spring arms 850 permit elastic deflection of the snap closure 830 against the other sections of the lower flat wall section 770. The snap closure 830 furthermore has an aperture 840.

If a plug which fits the socket housing 100 is plugged into the outer part 700 from the side remote from the inner part 200, a projection located on this plug can latch in the aperture 840 of the snap closure 830 and thereby secure the plug against inadvertent separation from the socket housing 100. The elastic deformability of the spring arms 850 in this case makes it possible for the projection on the plug to be able to slide past the snap closure 830 during fitting-together and finally to be able to engage in the aperture 840.

Deflection of the snap closure 830 beyond the limits of the elastic deformability of the spring arms 850 can result in damage to the socket housing 100. Therefore a section of the lower flat wall section 770 which is adjacent to the snap closure 830 in the direction of the inner part 200 forms a stop 860 with a stop projection 870 projecting in the direction of the snap closure 830. The stop 860 with the stop projection 870 prevents excessive deflection of the snap closure 830 in the direction of the stop 860. Since the snap closure 830 during fitting together of the socket housing 100 with a plug is deflected principally in the direction of the stop 860, the stop 860 and stop projection 870 prevent permanent damage to the socket housing 100 which might occur during fitting-together.

Figure 3:
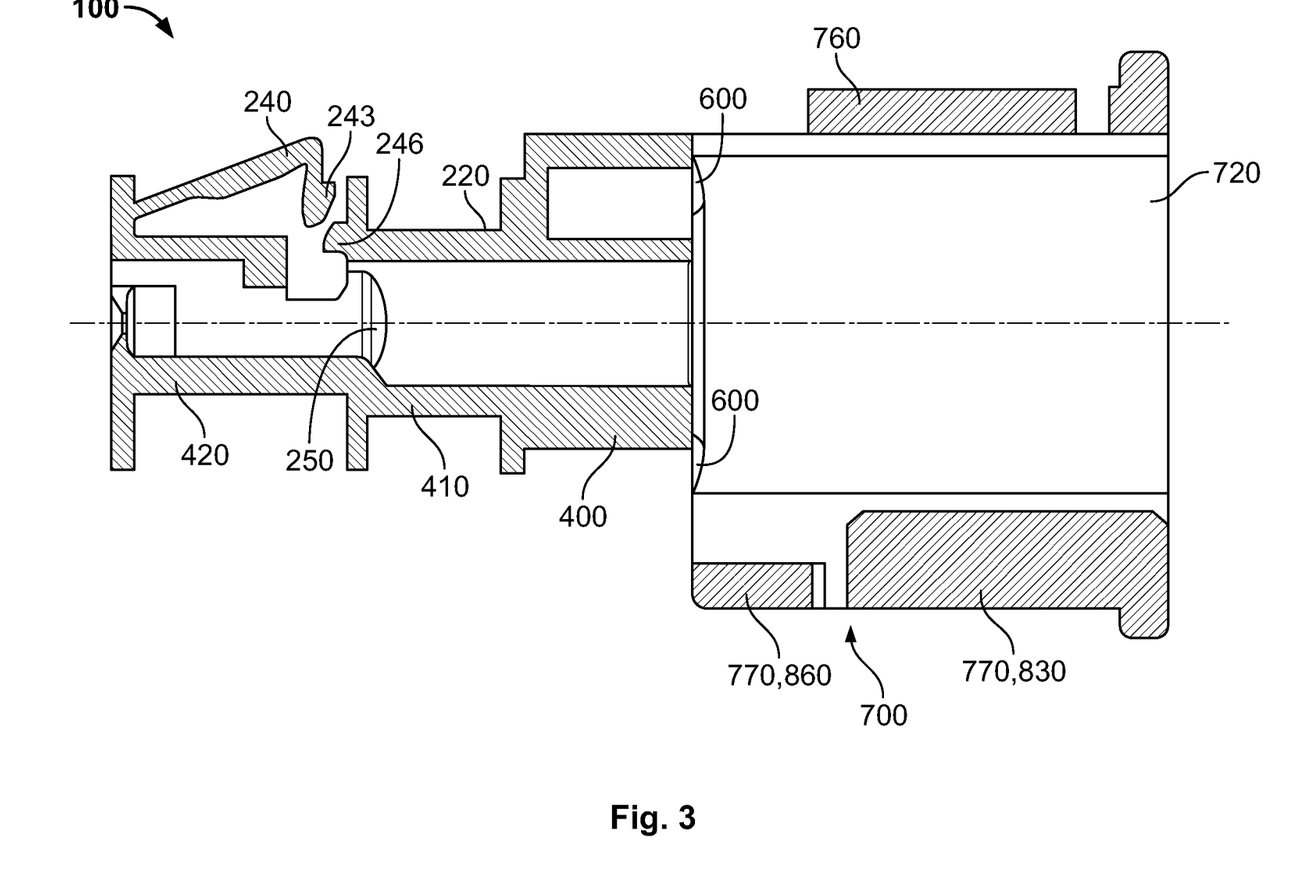
FIG. 3: a section through the socket housing along its longitudinal axis.

FIG. 3 shows a section through the socket housing 100 parallel to the longitudinal axis of the socket housing 100. It can be seen from FIG. 3 that the second contact securing means 240 has a first end which is connected in elastically deformable manner to the inner part 200. The elastic connection between the second contact securing means 240 and the inner part 200, permits pivoting of the second contact securing means 240. A second end of the second contact securing means 240 has a latch hook 243. The third section 420 of the inner part 200 has an aperture to the contact element receptacle 250. By pivoting the second contact securing means 240, the latch hook 243 of the second contact securing means 240 can be introduced into the aperture of the third section 420 and latched there with a latch projection 246. As soon as the latch hook 243 is latched to the latch projection 246, the second contact securing means 240 can no longer be pivoted. Furthermore, the latch hook 243 of the second contact securing means 240 in the latched state projects into the region of the one or more contact element receptacles 250. If contact elements are arranged in the contact element receptacles 250, these are fixed in the contact element receptacles 250 by the latch hook 243 of the second contact securing means 240.

Figure 4:
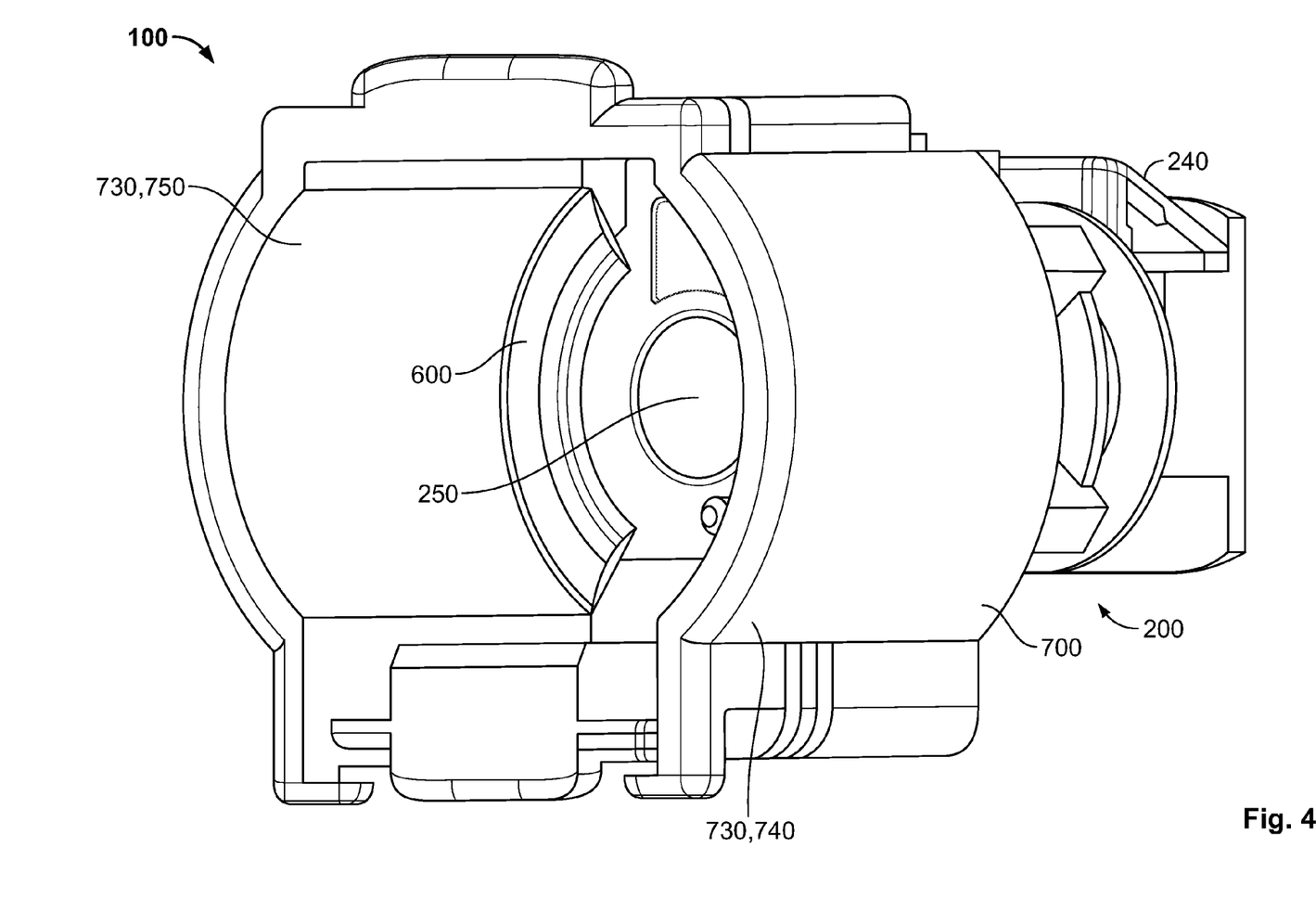
FIG. 4: a further perspective view of the socket housing.

FIG. 4 shows a further perspective view of the socket housing 100. Here, the illustration of FIG. 4 allows a view from the side of the outer part 700 which is remote from the inner part 200 into the cavity 720 surrounded by the wall 730 of the outer part 700. At the transition between the outer part 700 and the inner part 200, the section of the crosspiece 600 arranged on the second arcuate wall section 750 can be seen. The first arcuate wall section 740 has a corresponding section of the crosspiece 600, but this is not visible in FIG. 4. In the embodiment shown in FIG. 4, the crosspiece extends along the entire angle swept by the second arcuate wall section 750. In alternative embodiments, the crosspiece 600 may however also be provided merely in a partial angular range of the arcuate wall sections 740, 750 or as attachment via crosspieces.

Figure 5:
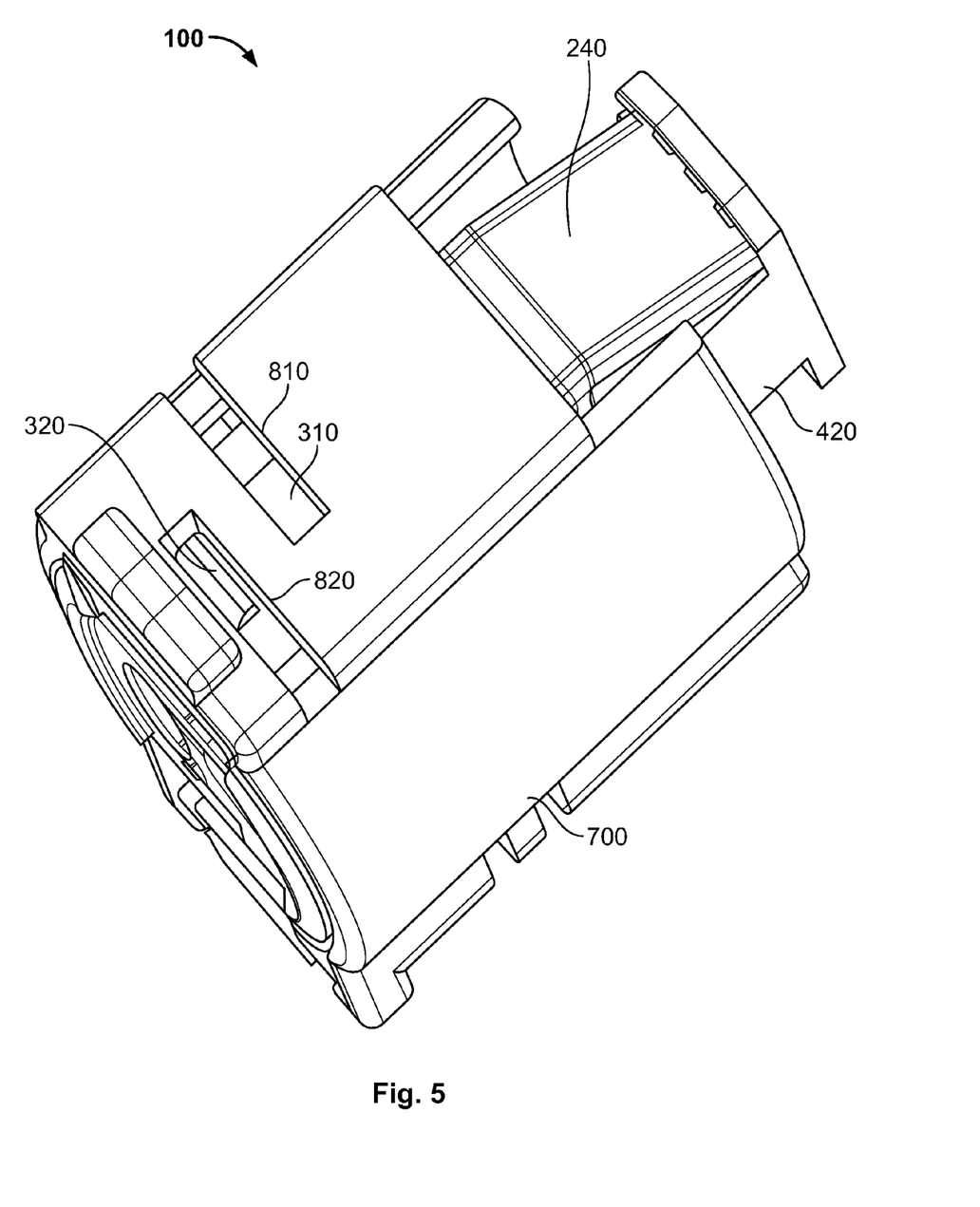
FIG. 5: a perspective view of the socket housing in the assembled state.

FIG. 5 shows a further perspective view of the socket housing 100. In the illustration of FIG. 5, the inner part 200 of the socket housing 100 is inserted into the cavity 720 surrounded by the wall 730 of the outer part 700. Thus the crosspiece in the illustration of FIG. 5 is severed or broken or torn apart. The first section 400 and the second section 410 of the inner part 200 are arranged completely in the cavity 720 of the outer part 700. The third section 420 projects so far beyond the outer part 700 that the end of the second contact securing means 240 which has the latch hooks 243 is arranged directly next to the upper flat wall section 760 of the wall 730 of the outer part 700. The first end face 280 of the first section 400 of the inner part 200 closes off flush with the end of the wall 730 of the outer part 700 which is remote from the crosspiece 600. The first locking hook 310 of the inner part 200 is engaged in the first locking slot 810 of the upper flat wall section 760 of the wall 730 of the outer part 700. The second locking hook 320 is engaged in the second locking slot 820.

The socket housing 100 may be produced in one piece, for example by injection moulding. In this case, the inner part 200 and the outer part 700 are connected together by a crosspiece 600. During the assembly of the socket housing, the crosspiece 600 is broken by exerting a force on the inner part 200 and the outer part 700, which separates the inner part 200 and the outer part 700 from each other. At the same time as the breaking of the crosspiece 600, the inner part 200 is inserted into the outer part 700, where it latches in its end position. The advantages of this socket housing 100 according to the invention lie in the simple and inexpensive production and the simple, inexpensive possibility of assembly which is not prone to failure.

The invention claimed is:

1. An electrical connector socket housing, comprising:
    an inner part having a contact receptacle extending between a front mating face and a rear face, the contact receptacle being formed to receive at least one electrically conductive contact element, and
    an outer part, a wall of the outer part defining a cavity, the outer part and the inner part being arranged adjoining one another, an external diameter of the inner part being equal to or less than an internal diameter of the outer part, the socket housing being formed in one piece, the inner part and the outer part being connected via a crosspiece formed as a predetermined breaking point.

2. A socket housing according to claim 1, wherein the crosspiece is arranged in circumambient manner, at least in sections, on an end-face end of the wall of the outer part facing the inner part.

3. A socket housing according to claim 1, wherein the crosspiece can be severed by exerting a force which is directed in the direction of the outer part on the inner part and/or a force which is directed in the direction of the inner part on the outer part such that the inner part, at least in sections, can be inserted into the cavity of the outer part.

4. A socket housing according to claim 3, wherein the inner part has at least one locking hook on its outer surface, and in that the outer part has at least one locking slot in its wall, the at least one locking hook and the at least one locking slot being arranged such that the at least one locking hook engages in the at least one locking slot if the inner part is inserted into the cavity of the outer part.

5. A socket housing according to claim 4, wherein the at least one locking hook has a chamfer which faces the outer part.

6. A socket housing according to claim 1, wherein a section of the wall of the outer part forms a snap closure, with an aperture, which is connected via at least one spring element to the other sections of the wall, the snap closure being able to be deflected against the other sections of the wall, a section of the wall adjacent to the snap closure forming a stop which limits the deflection ability of the snap closure in at least one spatial direction.

7. A socket housing according to claim 6, wherein the stop has a stop projection facing the snap closure.

8. A socket housing according to claim 1, wherein the inner part has an elastically pivotable lever, the lever being able to be latched with the inner part, the lever being formed to fix, in the latched position, a contact element which is received in the inner part.

9. A socket housing according to claim 1, wherein the inner part has a sealing region on which a sealing element can be arranged.

10. A socket housing according to claim 1, wherein the socket housing is produced from a thermoplastic material by injection moulding.

11. An electrical connector socket housing, comprising:
an inner part and an outer part, the inner part being formed to receive at least one electrically conductive contact element, and a wall of the outer part defining a cavity, the outer part and the inner part being arranged adjoining one another, an external diameter of the inner part being equal to or less than an internal diameter of the outer part, the socket housing being formed in one piece, the inner part and the outer part being connected via a crosspiece formed as a predetermined breaking point;
wherein a section of the wall of the outer part forms a snap closure, with an aperture, which is connected via at least one spring element to the other sections of the wall, the snap closure being able to be deflected against the other sections of the wall, a section of the wall adjacent to the snap closure forming a stop which limits the deflection ability of the snap closure in at least one spatial direction.

12. A socket housing according to claim 11, wherein the stop has a stop projection facing the snap closure.

\* \* \* \* \*